United States Patent [19]

Radocaj

[11] 4,392,840
[45] Jul. 12, 1983

[54] BELT TENSIONER

[75] Inventor: Mijo Radocaj, Massillon, Ohio

[73] Assignee: Dyneer Corporation, Canton, Ohio

[21] Appl. No.: 224,290

[22] Filed: Jan. 12, 1981

[51] Int. Cl.³ .......................... F16H 7/00; F16H 7/10
[52] U.S. Cl. .................................. 474/117; 474/118
[58] Field of Search .............. 474/117, 118, 115, 135, 474/138; 198/814; 192/45, 41 S

[56] References Cited

U.S. PATENT DOCUMENTS

| | | | |
|---|---|---|---|
| 2,051,488 | 8/1936 | Kottlowski et al. | 74/242.11 |
| 3,011,605 | 12/1961 | Hungerford, Jr. et al. | 192/41 S |
| 3,136,170 | 6/1964 | Murray | 74/242.11 |
| 3,298,486 | 1/1967 | Perryman | 192/41 S |
| 3,479,894 | 11/1969 | Buhr et al. | 474/135 |
| 3,483,763 | 12/1969 | Enters | 74/15.63 |
| 3,631,734 | 1/1972 | Wagner | 474/117 |
| 3,800,612 | 4/1974 | Fulghum | 474/135 |
| 3,812,733 | 5/1974 | Yoshida | 74/242.11 |
| 3,834,246 | 9/1974 | McGilp | 74/242.11 |
| 3,924,483 | 12/1975 | Walker et al. | 74/242.11 |
| 4,069,719 | 1/1978 | Cancilla | 474/135 |
| 4,108,013 | 8/1978 | Sragal | 74/242.11 |
| 4,159,048 | 1/1979 | Baxter et al. | 192/12 BA |

FOREIGN PATENT DOCUMENTS 965360  4/1975  Canada .................................. 192/28

OTHER PUBLICATIONS

Bulletin 962, Custom Products Corp.

Page47–Dec. 11, 1980, Edition Machine Design. A Penton/IPC Publication.

*Primary Examiner*—Leslie A. Braun
*Assistant Examiner*—Michael D. Bednarek
*Attorney, Agent, or Firm*—Frease & Bishop

[57] ABSTRACT

A device which maintains a predetermined tensioning force on the endless drive belt for vehicle accessories by use of a one-way clutch which prevents return of the tensioning means from its forwardmost tensioning position. In the preferred embodiment, a cylindrical shaft is mounted in a fixed position adjacent the drive belt. A roller clutch assembly is mounted on the shaft and includes an outer clutch housing rotatably mounted on the shaft. An outwardly extending lever is attached to the clutch housing and has an idler pulley rotatably mounted on the extended end of the lever. The pulley is moved into tensioning engagement with the drive belt by a torsional spring which is telescopically mounted on the shaft and clutch housing. The spring moves the pulley in a belt tensioning direction. The one-way clutch assembly preferably includes a roller clutch which consists of a plurality of rollers which are interposed between and are biased by a plurality of leaf springs into a wedging relationship with the shaft surface and ramps formed on a bearing cup. The rollers permit free movement of the clutch housing and attached lever in the belt tensioning direction while preventing movement of these components and associated idler pulley in the opposite nontensioning direction because of the wedging action of the rollers.

11 Claims, 12 Drawing Figures

BELT TENSIONER

BACKGROUND OF THE INVENTION

1. Field of the Invention

The invention relates to belt tensioning devices, and in particular to spring-biased belt tensioning devices for use with the endless drive belts of the drive systems for vehicle accessories. More particularly, the invention relates to an extremely simple and inexpensive belt tensioner operable by a torsional coil spring which applies a nearly constant predetermined tensioning force on the endless drive belt by an idler pulley, and in which a one-way clutch assembly prevents movement of the idler pulley in the opposite nontensioning direction.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To ensure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use coil springs which are either in compression or tension, for applying and maintaining the tensioning force on a belt-engaging idler pulley or chain-engaging sprocket. Some examples of these types of constructions are shown in U.S. Pat. Nos. 2,703,019, 2,893,255, 3,413,866, 3,483,763, 3,631,734, 3,768,324, 3,812,733, 3,924,483, 3,965,768 and 4,108,013. Some of these various coil spring-actuated devices use the biasing force of a spring in combination with hydraulic-actuated members for regulating the amount of tensioning force applied to the belt, depending on whether the engine is running or shut off. Examples of these combination spring and hydraulic belt tensioners are shown in U.S. Pat. Nos. 2,051,488, 3,142,193 and 4,077,272.

Other types of tensioning devices and arrangements are provided with some type of mechanical retaining means, usually a ratchet-pawl retaining mechanism, which limits the movement of the belt tensioning member in an opposite nontensioning direction, thereby maintaining a constant tensioning force on the endless drive belt and eliminating the undesirable effects of belt whipping. Examples of these prior constructions and arrangements having such retaining mechanisms are shown in U.S. Pat. Nos. 2,051,488, 2,703,019, 3,413,866, 3,631,734 and 3,812,733.

Other known belt tensioner constructions, such as shown in U.S. Pat. No. 3,924,483, use a torsional spring for pivotally moving one of the vehicle accessories to achieve the desired tensioning force. Other constructions, such as shown in U.S. Pat. Nos. 3,136,170, 3,483,763 and 3,834,246, use a torsional coil spring for pivotally moving a lever and idler pulley into belt tensioning engagement which provides a relatively simple, economical and compact unit. However, none of these devices are provided with a mechanism for maintaining the idler pulley in its forwardmost belt tensioning position. This subjects the tensioner to undesirable belt whipping and vibrations which occur in those devices using a coil spring for applying the tensioning force.

There is no known belt tensioning device of which I am aware which imparts a nearly constant predetermined tensioning force on an endless accessory drive belt by use of a torsional coil spring in a simple and inexpensive arrangement, which maintains this nearly constant pressure on the belt whether the engine is on or off or operating at various speeds, and which reduces belt whip and achieves a highly efficient damping effect by a one-way clutch assembly which maintains the tensioning components in their forwardmost belt tensioning position.

SUMMARY OF THE INVENTION

Objectives of the invention include providing an improved belt tensioner in which a single torsional spring biases a pivotally mounted lever in a belt tensioning direction to bring an idler pulley mounted on an extended end of the lever into tensioning engagement with the endless drive belt of a vehicle accessory drive system to exert a predetermined tensioning force on the belt whether the vehicle is on or off or operating at various speeds or conditions. Another object is to provide a belt tensioner in which the torsional spring is telescopically mounted on a fixed shaft assembly, and in which a one-way clutch also is mounted on a section of the shaft assembly and is operatively engaged with the shaft assembly and pulley lever, whereby the lever and idler pulley are free to rotate in the belt tensioning direction but are prevented from movement in the nontensioning direction by the action of the one-way clutch; and in which such a construction provides an efficient belt damping action and eliminates vibration which occurs in belt tensioners using coil springs as the tensioning medium, thereby eliminating the harmful effects of belt whip.

Another object is to provide a belt tensioner in which the one-way clutch is a roller clutch which is telescopically mounted on an intermediate section of the shaft assembly within an outer clutch housing which is rotatably mounted on a reduced outer end of the shaft assembly; and in which the roller clutch includes a plurality of rollers biased by leaf springs along individual ramp surfaces formed within a bearing up in which the rollers are mounted, with the rollers being engaged with the shaft and clutch housing to provide the one-way clutching effect. Another object is to provide such a belt tensioner in which the one-way clutch is of a spring wrap design in which a second coil spring is mounted in a wrapped configuration on the shaft assembly and is operatively connected to the pulley lever to provide the one-way clutching effect.

Still another object is to provide a belt tensioner which is of an extremely rugged and inexpensive design, which reduces maintenance and repair problems, which provides a sufficient belt tensioning biasing force by means of a coil spring, preferably a torsional spring, which provides an extremely efficient damping means for the tensioner by use of a one-way clutch to prevent backlash and vibration caused by belt whip; and which achieves the stated objectives in a simple, efficient and effective manner, and which solves problems and satisfies needs existing in the art.

These objectives and advantages are obtained by the improved belt tensioner construction for tensioning an endless drive belt of the drive system for vehicle accessories, the general nature of which may be stated as including shaft means adapted to be mounted in a fixed position adjacent the drive belt; pulley means movably mounted on the shaft means and movable in a belt tensioning direction for tensioning engagement with the drive belt; spring means biasing the pulley means in the belt tensioning direction; and clutch means operatively engaged with the pulley means and the shaft means, said clutch means permitting movement of the pulley means in the belt tensioning direction and restraining movement of the pulley means in a direction opposite to the belt tensioning direction.

BRIEF DESCRIPTION OF THE DRAWINGS

Preferred embodiments of the invention—illustrative of the best modes in which applicant has contemplated applying the principles—are set forth in the following description and are shown in the accompanying drawings and are particularly and distinctly pointed out and set forth in the appended claims.

Similar numerals refer to similar parts throughout the drawings.

DESCRIPTION OF THE PREFERRED EMBODIMENTS

First Embodiment

Figure 1:
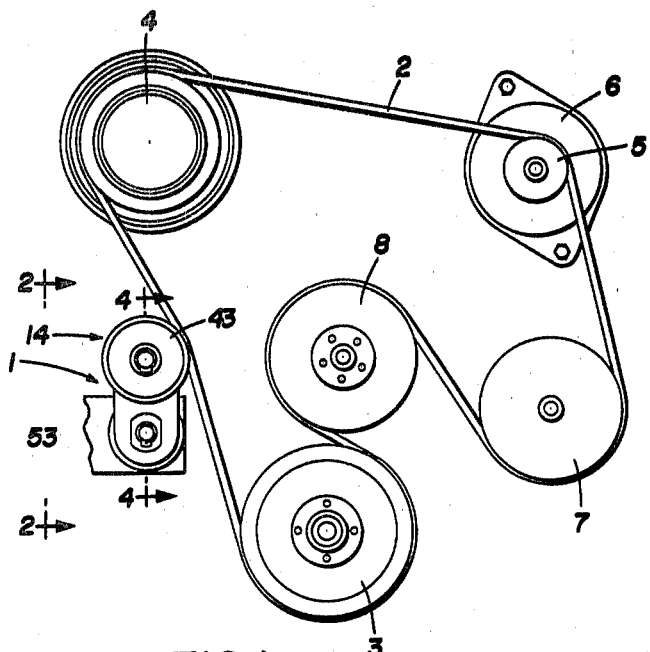
FIG. 1 is a diagrammatic view looking toward the front of an engine illustrating an endless drive belt operatively connected to and driving the vehicle accessories, with the improved belt tensioner engaged with the belt.

Referring to FIG. 1 of the drawings, the improved belt tensioner is indicated generally at 1, and is shown in tensioning engagement with an endless drive belt 2 of a power transmission belt drive system which is shown diagrammatically looking toward the front of an engine. The accessory drive system consists of a plurality of belt pulleys or sheaves having configurations and diameters determined by and associated with engine accessory components and their locations relative to each other. The various pulleys are supported on their respective engine components which, in turn are mounted on an engine (not shown) in a usual manner known in the art. Belt 2 preferably operates in a single vertical plane to eliminate binding and skewing of the belt.

The particular engine accessories drive system shown in FIG. 1 consists of a main driving pulley 3 which is operatively connected to the main drive shaft of the engine, a pulley 4 which is operatively connected to the engine air pump, a pulley 5 which is operatively connected to an alternator 6 which provides electrical power for the engine, a pulley 7 which is operatively connected to the vehicle power steering unit, and a pulley 8 which is operatively connected to the engine water pump.

Figure 2:
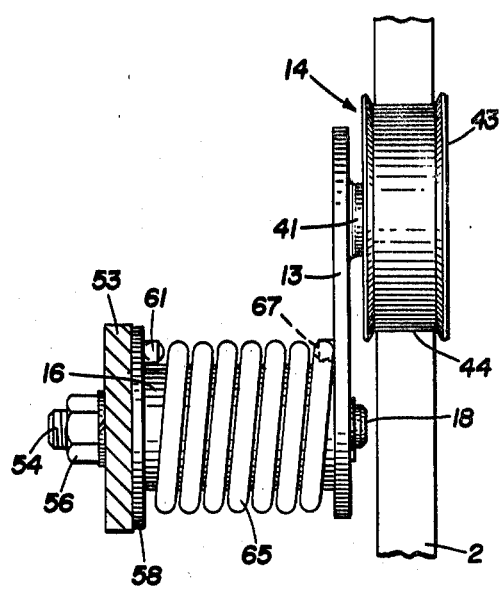
FIG. 2 is an enlarged end elevational view looking in the direction of arrows 2—2, FIG. 1.
Figure 4:
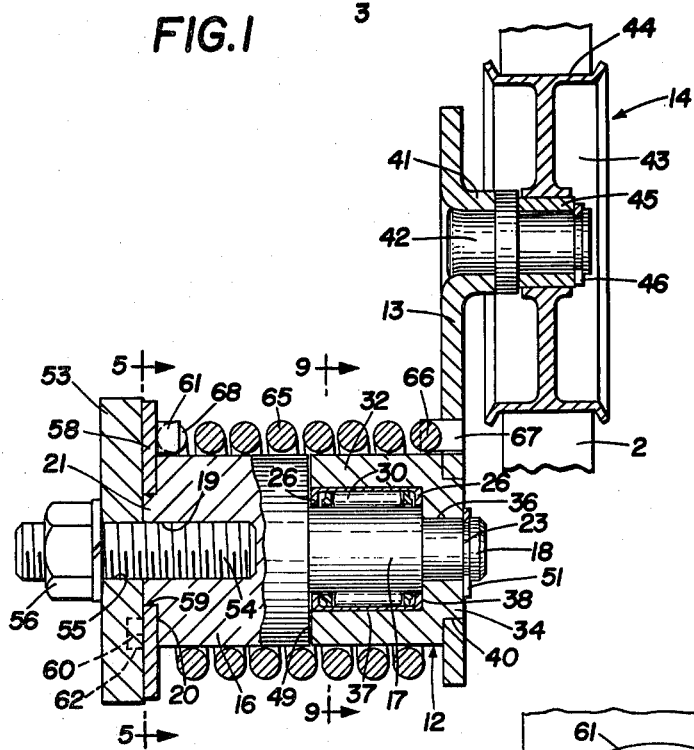
FIG. 4 is an enlarged sectional view taken on line 4—4, FIG. 1.
Figure 3:
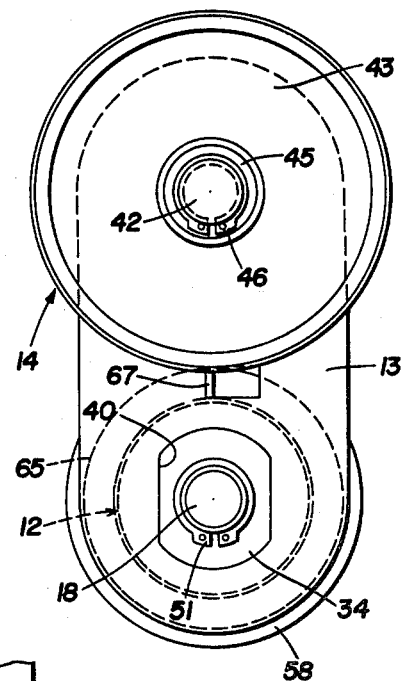
FIG. 3 is an enlarged front elevational view of the improved belt tensioner as shown in FIG. 1 removed from its engine mounting position.
Figure 6:
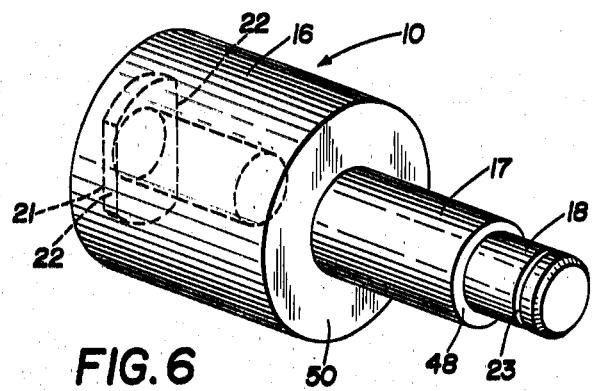
FIG. 6 is a perspective view of the fixed shaft component of the improved belt tensioner.
Figure 7:
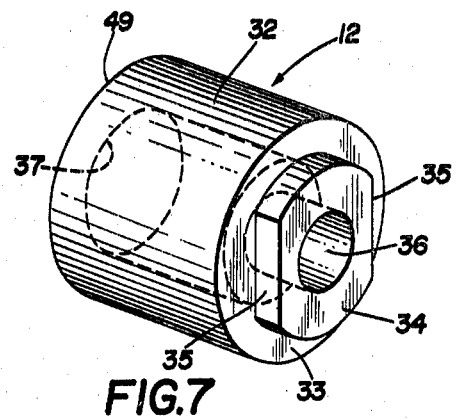
FIG. 7 is a perspective view of the clutch housing component of the improved belt tensioner.
Figure 8:
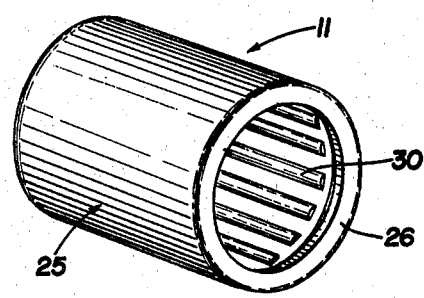
FIG. 8 is a perspective view of a roller clutch which provides the one-way clutch means of the improved belt tensioner shown in FIGS. 1-10.

Improved belt tensioner 1 includes as main components a shaft assembly indicated generally at 10 (FIG. 6), a one-way roller clutch indicated generally at 11 (FIG. 8), a clutch housing indicated generally at 12 (FIG. 7), a lever 13 and an idler pulley assembly, indicated generally at 14 (FIGS. 2-4).

Shaft assembly 10 preferably is formed as an integral, one-piece, cylindrical-shaped member having three distinct shaft sections 16, 17 and 18 decreasing in diameter from section 16 to section 18. A threaded hole 19 is formed in the largest diameter shaft section 16 and communicates with the cylindrical rear surface 20 of section 16 on which a boss 21 is formed. Boss 21 is formed with a pair of straight sides 22. An annular groove 23 is formed in the smallest diameter shaft section 18 adjacent the outer end thereof.

Roller clutch 11 is of the type which transmits torque between a shaft and clutch housing in one direction and allows free overrun in the opposite direction, and is a known component having many applications in various types of equipment and machinery. One such roller clutch found satisfactory is sold by Torrington Manufacturing Company of Torrington, Conn., under the designation "Type DC Roller Clutches," with the particular model shown in the drawings and described more fully below being referred to as "Type RC-FS."

Figure 10:
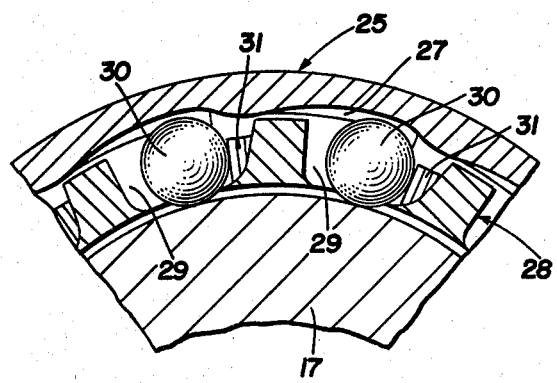
FIG. 10 is a greatly enlarged fragmentary sectional view of a portion of FIG. 9 showing the roller clutch of FIG. 8 mounted on the shaft assembly of FIG. 6.

Roller clutch 11 includes a cylindrical outer bearing cup, indicated generally at 25, which includes a pair of inwardly extending, annular-shaped end wall flanges 26. A plurality of circumferentially spaced inclined ramp surfaces 27 (FIG. 10) are formed along the interior surface of bearing cup 25. A roller cage 28 is telescopically mounted within bearing cup 25 by end wall flanges 26 and is formed with a plurality of spaced axially extending openings 29, each of which is associated with an individual ramp surface 27 for receivably mounting a cylindrical-shaped roller 30. Each roller 30 is forced into abutting engagement with its respective ramp surface 27 by a leaf spring 31. The number and arrangement of rollers 30 may vary without affecting the concept of the invention since roller clutches come in various sizes and configurations other than that described above and shown in FIGS. 8 and 10.

Clutch housing 12 has a cylindrical configuration formed by a cylindrical wall 32 closed at one end in a circular wall 33 having a boss 34 formed integrally therewith and projecting outwardly from wall 33. Boss 34 is provided with a pair of spaced straight side walls 35. A circular hole 36 is formed in boss 34 and communicates with an axially extending central bore 37 formed by clutch housing cylindrical wall 32. Central bore 37 does not extend completely through clutch housing 12 and terminates in an annular shoulder 38 (FIG. 4) adjacent boss 34 in which end wall hole 36 is formed. The diameter of end wall hole 36 is complementary to the outer diameter of shaft section 18 and the diameter of clutch housing bore 37 is complementary to the outer diameter of bearing cup 25.

Lever 13 is a relatively flat stamped sheet metal member formed with a lower opening 40 having a pair of opposite straight sides and a configuration complementary to the outer configuration of clutch housing boss 34 enabling lever 13 to be telescopically mounted on boss 34 for rotation with clutch housing 12. Lever 13 is secured by some means such as a force fit, retaining washer, brazing or welding on boss 34 of clutch housing 12. The extended end of lever 13 is formed with an annular boss 41 (FIG. 4) in which a stub shaft 42 is fixedly mounted.

Pulley assembly 14 includes a usual pulley 43 which is rotatably mounted on the extended end of stub shaft 42 by a bearing ring 45 and which is formed with a peripheral belt-receiving groove 44. A snap ring 46 is seated in a groove formed in the extended end of stub shaft 42 and retains bearing 45 and pulley 43 in a rotatably mounted position on shaft 42.

Roller clutch 11 is telescopically mounted on intermediate shaft section 17 and is received within central bore 37 of clutch housing 12 (FIG. 4). Clutch housing 12 is rotatably mounted on shaft section 18 by the extension of shaft section 18 through complementary-shaped end wall hole 36. Roller clutch 11 is retained in position on shaft section 17 by annular shoulder 38 of clutch housing 12 abutting against one end wall flange 26 of roller clutch 11, with shoulder 38 also abutting against an annular shoulder 48 formed between shaft sections 17 and 18 (FIG. 6) to properly position clutch housing 12 and clutch 11 on shaft assembly 10. Annular end wall 49 at the open end of clutch housing 12 opposite boss 34 is spaced from an annular shoulder 50 which is formed by shaft sections 16 and 17 to eliminate any rotational friction therebetween. Clutch housing 12 and roller clutch 11 are retained on their respective shaft sections 18 and 17, respectively, by a snap ring 51 which is seated in groove 23 of shaft section 18.

Improved belt tensioner 1 is mounted on a vehicle engine closely adjacent drive belt 2 by a mounting bracket 53. A threaded stud bolt 54 is threadably engaged in hole 19 of shaft section 16 and extends through a hole 55 formed in mounting bracket 53, with shaft assembly 10 being firmly attached to bracket 53 by a clamping nut 56.

Figure 5:
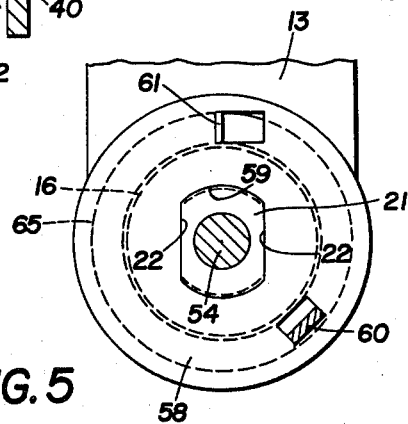
FIG. 5 is a fragmentary sectional view taken on line 5—5, FIG. 4.

A washer 58 (FIGS. 4 and 5) is formed with a central opening 59 complementary in shape and size to boss 21 of shaft section 16 which is telescopically received in opening 59. Washer 58 is formed with a pair of tabs 60 and 61 which extend in opposite directions from washer 58. Tab 60 is received within a complementary-shaped hole 62 formed in mounting bracket 53 and forms an alignment pin which prevents rotation of washer 58 and, correspondingly, of shaft assembly 10 with respect to mounting bracket 53.

Figure 9:
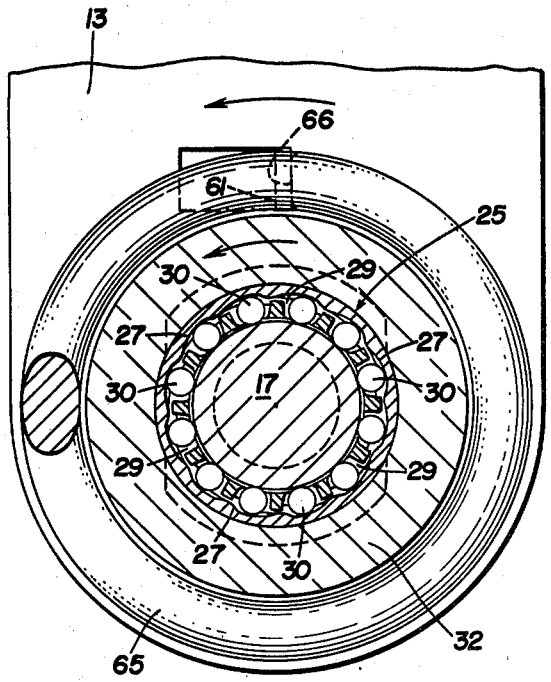
FIG. 9 is an enlarged fragmentary sectional view taken on line 9—9, FIG. 4.

A torsional coil spring 65 is telescopically mounted on shaft assembly 10 and, in particular, on shaft section 16 and clutch housing 12 which has an outer diameter generally equal to the diameter of shaft section 16, as shown in FIG. 4. One end 66 of torsional spring 65 abuts against an inwardly projecting tab 67 formed on lever 13 to operatively connect spring 65 to the lever (FIG. 9). Opposite spring end 68 is abutted against tab 61 of washer 58.

The operation of improved belt tensioner 1 is described briefly below. Tensioner 1 is mounted on the vehicle engine closely adjacent belt 2 by mounting bracket 53. Pulley 43 is moved in a clockwise direction with respect to FIG. 1 against belt 2 after affixing only one end of spring 65 against its respective tab 61 or 67. After pulley 43 is moved to this initial tensioning position, a spanner wrench or the like winds spring 65 a predetermined amount about shaft assembly 10 in the proper rotational direction until the desired load is placed on the spring. The unattached spring end then is placed in tab abutment to affix spring 65 in position on shaft assembly 10. The direction of spring movement required to load spring 65 is determined by which spring end is initially free. Spring 65 will continue to move lever 13 and pulley assembly 14 in the belt tensioning direction as belt 2 stretches to maintain a generally constant predetermined tensioning force on the belt throughout its life. The amount of tensioning force applied to the belt is easily determined by the particular rate characteristics of the chosen spring 65 and by the amount of loading initially placed on the spring.

In accordance with one of the main features of the invention, roller clutch 11 prevents return of lever 13 in the nontensioning direction, thereby maintaining pulley 43 in its forwardmost tensioning engagement with belt 2 even when belt whip or a force counter to the tensioning force is experienced by the tensioning pulley. This feature is achieved by the mounting of the idler pulley assembly on a one-way clutch, such as roller clutch 11.

The particular one-way clutch shown in the drawings and described above prevents or restrains movement in the nontensioning direction by the wedging action of rollers 30 between their respective ramp surfaces 27 and the outer surface of shaft section 17 due to the biasing action of leaf springs 31 maintaining rollers 30 biased against their respective ramp surfaces. This wedging one-way clutch arrangement provides an extremely satisfactory clutch means preventing movement of clutch housing 12 and, correspondingly, of lever 13 in the nontensioning direction.

Second Embodiment

Figure 12:
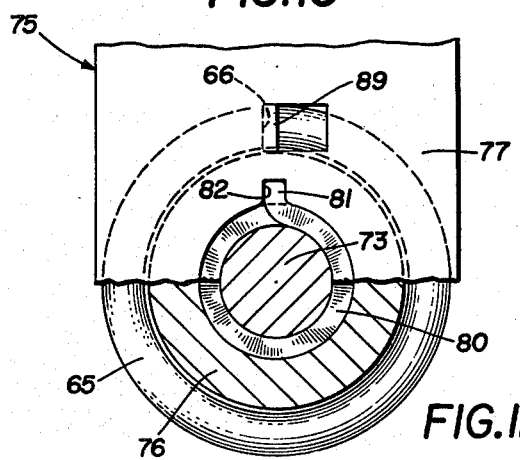
FIG. 12 is an enlarged sectional view taken on line 12—12, FIG. 11.
Figure 11:
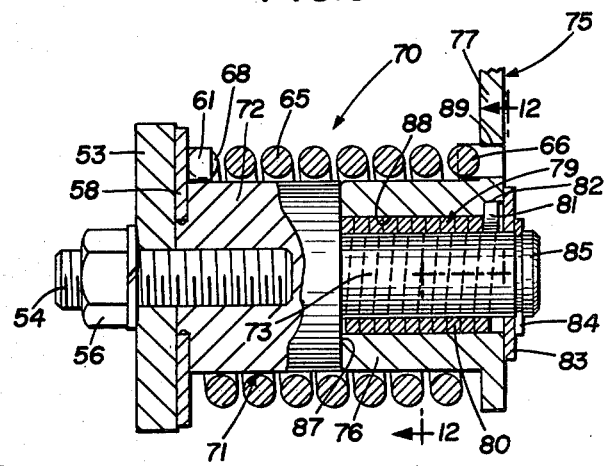
FIG. 11 is a fragmentary sectional view similar to FIG. 4 showing a modified form of the improved belt tensioner.

Another embodiment of the improved belt tensioner construction having a one-way clutch as one of the main features thereof, is indicated generally at 70 and is shown in FIGS. 11 and 12. Many of the components of tensioner 70 are similar to those of tensioners 1 and, therefore, are not discussed in detail and are referred to in FIGS. 11 and 12 by the same numbers as used for tensioner 1 of FIGS. 1–10. Modified tensioner 70 includes a fixed shaft assembly 71 having a large diameter shaft section 72 similar to shaft section 16 of shaft assembly 10, and an integrally connected reduced diameter shaft section 73. Shaft assembly 71 is mounted on engine mounting bracket 53 in the same manner as tensioner 1.

Modified belt tensioner 70 includes a lever 75 for movably mounting idler pulley 43 on shaft assembly 71. The mounting end of lever 75 is formed with a cylindrical hub 76 preferably formed integrally with an upwardly extending flat plate portion 77 of lever 75. The upper portion of lever plate 77 and the mounting of an idler pulley thereon is similar to that of tensioner 1 and, therefore, is not described in further detail nor shown in the drawings.

The main difference of modified tensioner 70 with respect to tensioner 1 is the replacement of one-way roller clutch 11 with a different one-way clutch means, namely a wrap spring arrangement. The one-way clutch mechanism of tensioner 70 is indicated generally at 79 and consists of a wrap spring 80, the individual coils of which have a rectangular cross-sectional configuration. An outer end 81 of wrap spring 80 is bent in a radially outward direction with respect to the cylindrical coiled configuration of spring 80 and is seated in a complementary-shaped opening 82 formed in cylindrical hub 76. A retaining washer 83 is telescopically mounted on the outer end of shaft section 71 by a snap ring 84 seated within an annular groove 85 formed in the outer end of shaft section 73. Washer 83 retains lever 75 and wrap spring 80 in their assembled positions on shaft section 73. The opposite end of wrap spring 80 need not be connected to any component, with the endmost spring convolution being in abutment with an annular shoulder 87 formed at the juncture of shaft sections 72 and 73.

The use of wrap springs to function as a one-way clutch is not new in and of itself since such construction has been in use in other applications completely different from belt tensioners. Lever hub 76 has a central bore 88 which is complementary with the outer diameter of wrap spring 80 enabling lever 75 to be movably mounted with respect to spring 80 and to shaft section 73. The outer diameter of lever hub 76 is generally equal to the outer diameter of shaft section 72 to form a generally continuous cylindrical surface about which torsional coil spring 65 is mounted as in tensioner 1. Torsional spring end 66 abuts a tab 89 formed on lever plate 77 with opposite spring end 68 abutting washer tab 61 to operatively mount spring 65 on shaft assembly 71 in a similar manner as in tensioner 1.

The operation of modified tensioner 70 is similar in most respects to the operation of tensioner 1 described above except that movement of the idler pulley and mounting lever in the nontensioning direction is prevented by the wedging or binding action of wrap spring 80 between the internal bore surface of lever hub 76 and the outer surface of fixed cylindrical shaft section 73. This wrap spring arrangement permits free movement of lever 75 in the belt tensioning direction while preventing return movement from its forwardmost belt tensioning position.

SUMMARY

Although the above discussed constructions of belt tensioners 1 and 70 disclose an idler pulley which is pivotally mounted on a shaft and is moved into tensioning engagement with the drive belt by a torsional spring, the principles of the invention can also be incorporated into a tensioning construction in which a pivotally mounted vehicle accessory is moved by a spring, a hydraulic or pneumatic cylinder or other actuating force to tension the drive belt with the pulley of the particular pivotally mounted vehicle accessory performing the same function as idler pulley 43. In such an arrangement the roller clutch or wrap spring clutch would function basically the same as described above to prevent movement of the pivotally mounted accessory in the nontensioning direction.

Other types of one-way clutches than the roller clutch and wrap spring clutch discussed above also can be mounted on a shaft assembly and operatively connected with a lever-pulley assembly without affecting the concept of the invention. Another example of such a clutch would be a torque limiting clutch of the type distributed by the Formsprag Division of Dana Corporation of Mt. Pleasant, Mich., under its trademark FORMSPRAG.

Improved belt tensioners 1 and 70 provide constructions which have a number of advantageous features. These constructions prevent backing off or slacking of belt 2 as a result of belt whipping since idler pulley 43 is prevented from movement in the nontensioning direction due to the unique wedging action exerted by rollers 30 and the binding action of wrap spring 80. Furthermore, neither of these two components interfere in any manner with the movement of the idler pulleys in the belt tensioning direction. Another advantage of the improved belt tensioner constructions is that maintenance can be performed easily on the vehicle accessories by releasing the tensioning pressure exerted by torsional coil springs 65 by removing one of the spring ends from abutment with its associated tab. Still another advantage is the relatively simple and inexpensive construction of the various components which enable them to be manufactured easily in mass quantities. Also the belt tensioners can be mounted on an engine by a simple mounting bracket which may have various configurations to conform with the space limitations of the particular vehicle in which tensioners 1 and 70 may be mounted.

Accordingly, the improved belt tensioner constructions provide a simplified, effective, safe, inexpensive, rugged and efficient tensioning means which achieves all of the enumerated objectives, provides for eliminating difficulties encountered with prior tensioning devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved belt tensioner is constructed and used, the characteristics of the construction, and the advantageous, new and useful results obtained; the new and useful structures, devices, elements, arrangements, parts, and combinations are set forth in the appended claims.

I claim:

1. An improved belt tensioner construction for tensioning an endless drive belt of the drive system for vehicle accessories, said construction including:
   (a) shaft means adapted to be mounted in a fixed position adjacent the drive belt;
   (b) pulley means movably mounted with respect to the shaft means and movable in a belt tensioning direction for tensioning engagement with the drive belt;
   (c) torsional spring means telescopically mounted on the shaft means for biasing the pulley means in the belt tensioning direction; and
   (d) clutch means telescopically mounted on the shaft means within the torsional spring means and operatively engaged with the pulley means and the shaft means for permitting movement of the pulley means in the belt tensioning direction and for restraining movement of the pulley means in a direction opposite to the belt tensioning direction.

2. The belt tensioner construction defined in claim 1 in which one end of the torsional spring means is connected to the pulley means and the other end of the spring means is fixed with respect to the shaft means.

3. The belt tensioner construction defined in claim 2 in which the pulley means includes a lever and an idler pulley; in which the lever has first and second ends with the first end being pivotally mounted on the shaft means; and in which the idler pulley is rotatably mounted on the second end of the lever and is moved into tensioning engagement with an endless drive belt by the torsional spring.

4. The belt tensioner construction defined in claim 1 in which the clutch means includes a roller clutch having an annular bearing cup provided with a plurality of interior ramps, a roller cage, a plurality of rollers mounted in the roller cage with each of said rollers being associated with a respective ramp, and a plurality of springs each biasing a respective roller along its associated ramp and into engagement with the shaft means.

5. The belt tensioner construction defined in claim 4 in which the clutch means further includes a cylindrical cupshaped housing rotatably mounted on the shaft means; in which the bearing cup is seated within a central opening formed in the cupshaped housing; and in which the pulley means includes a lever and an idler pulley, with said lever being mounted on the clutch housing for movement with said housing to move the idler pulley into tensioning engagement with the drive belt.

6. The belt tensioner construction defined in claim 5 in which the shaft means includes at least three integrally connected shaft sections of different diameters; in which engine mounting means is engaged with the largest diameter shaft section for mounting the tensioner in a position closely adjacent the drive belt; in which the clutch bearing cup is mounted on the intermediate diameter shaft section; and in which the clutch housing is telescopically rotatably mounted on the smallest diameter shaft section of the three shaft sections.

7. The belt tensioner construction defined in claim 6 in which the engine mounting means includes a washer telescopically mounted on a boss formed on an end of the largest diameter shaft section, a bracket adapted to be mounted on the vehicle engine, and a bolt engaged in a threaded hole formed in the boss and said largest shaft section, with said bolt being clampingly engaged with the bracket.

8. The belt tensioner construction defined in claim 7 in which the washer and boss are formed with complementary engaged straight sides, and in which a pair of tabs is formed on the washer, one of which is adapted to be received within an alignment hole formed in the engine mounting bracket and the other of said tabs providing an abutment for engagement with an end of the torsional spring.

9. The belt tensioner construction defined in claim 1 in which the clutch means is a wrap spring clutch including a coil spring wrapped about the shaft means and operatively connected to and engaged with the pulley means.

10. The belt tensioner construction defined in claim 9 in which the coils of the wrap spring have rectangular cross-sectional configurations.

11. The belt tensioner construction defined in claim 9 in which the pulley means includes a cylindrical hub having a radially outwardly extending lever mounted thereon and an idler pulley rotatably mounted on an extended end of the lever; and in which the hub is telescopically mounted on and engaged with the wrap spring.

* * * * *